United States Patent [19]
Yamashita et al.

[11] Patent Number: 5,910,466
[45] Date of Patent: Jun. 8, 1999

[54] CATALYST FOR PURIFYING EXHAUST GAS

[75] Inventors: Koichi Yamashita, Susono; Mikio Murachi, Toyota, both of Japan

[73] Assignee: Toyota Jidosha Kabushiki Kaisha, Toyota, Japan

[21] Appl. No.: 08/993,013

[22] Filed: Dec. 18, 1997

[30] Foreign Application Priority Data

Dec. 25, 1996 [JP] Japan ..................... 8-346189

[51] Int. Cl.$^6$ .......................... C01B 17/16; C01G 45/02; C01G 49/02; B01J 23/58
[52] U.S. Cl. .......................... 502/300; 423/221; 423/231; 423/605; 423/632; 502/102; 502/300
[58] Field of Search .................... 423/221, 231, 423/605, 632; 502/102, 300

[56] References Cited

U.S. PATENT DOCUMENTS

| | | | |
|---|---|---|---|
| 4,916,106 | 4/1990 | Koschlig et al. | 502/309 |
| 5,439,865 | 8/1995 | Abe et al. | 502/333 |
| 5,610,117 | 3/1997 | Horiuchi et al. | 502/324 |
| 5,622,680 | 4/1997 | Monceaux et al. | 423/213.5 |
| 5,643,543 | 7/1997 | Guibard et al. | 423/213.5 |
| 5,670,444 | 9/1997 | Yoshida et al. | 502/331 |

FOREIGN PATENT DOCUMENTS

| | | |
|---|---|---|
| 61-33232 | 2/1986 | Japan . |
| 62-277150 | 12/1987 | Japan . |
| 7-155601 | 6/1995 | Japan . |

*Primary Examiner*—Gary P. Straub
*Assistant Examiner*—Cam N. Nguyen
*Attorney, Agent, or Firm*—Oblon, Spivak, McClelland, Maier & Neustadt, P.C.

[57] ABSTRACT

The present invention relates to a catalyst for purifying an exhaust gas, and in particular provides a catalyst for purifying an exhaust gas using a complex oxide, which is not deteriorated in its purifying performance even in a lean atmosphere containing sulfur dioxide $SO_2$ at temperatures as high as at least 1,000° C., comprising at least one of the noble metals and one or at least two elements selected from the group consisting of alkaline earth metals and Group IIIA elements, and at least one member selected from the group consisting of iron, nickel and cobalt is supported in the surface portion of the catalyst, the catalyst further comprising, as a constituent element of the complex oxide, at least one element selected from the group consisting of iron, nickel and cobalt.

8 Claims, No Drawings

CATALYST FOR PURIFYING EXHAUST GAS

BACKGROUND OF THE INVENTION

1. Field of the Invention

The present invention relates to a catalyst for purifying an exhaust gas. The present invention particularly relates to a catalyst for purifying an exhaust gas containing a complex oxide which does not deteriorate even in a lean atmosphere containing sulfur dioxide $SO_2$ at a temperature as high as at least 1,000° C.

2. Description of the Prior Art

In catalysts for purifying an exhaust gas of automobiles, etc., noble metals such as Pt, Pd and Rh are used singly or in combinations as the catalyst component. The catalyst component is usually supported on a catalyst support. For example, the present applicants have proposed in Japanese Unexamined Patent Publication (Kokai) No. 62-277150 that the use of a perovskite type complex oxide of Pt, and a lanthanoid element or alkaline earth metal element, or an analogous complex oxide, as a catalyst for purifying an exhaust gas of internal combustion engines prevents thermal deterioration and alloying of Pt, and improves the durability and the purification performance.

Although the durability, etc., can be significantly improved compared with the prior catalysts, the perovskite type complex oxide starts to decompose when the exhaust gas temperature exceeds 900° C. The exhaust gas temperature in automobiles has been greatly increased, due to various kinds of exhaust gas regulations enacted in recent years, and the development of a catalyst which can sufficiently purify an exhaust gas even at temperatures exceeding 1,000° C. is desired.

Although the initial object has been accomplished by a catalyst which is a highly heat-resistant complex oxide containing Pt and which has been proposed as the desired catalyst by the present applicants in Japanese Patent Application No. 8-184465, it has been found that the proposed catalyst cannot produce sufficient effects when the exhaust gas contains $SO_2$. Accordingly, a catalyst exhibiting sufficient durability even when the exhaust gas contains $SO_2$ is desired.

SUMMARY OF THE INVENTION

The present invention is directed to preventing catalyst poisoning in an exhaust gas atmosphere containing $SO_2$, and to provide a catalyst for purifying an exhaust gas containing a highly heat-resistant complex oxide which contains a noble metal and which shows improved durability at high temperatures.

Furthermore, another object of the present invention is to provide a highly heat-resistant catalyst for purifying an exhaust gas in which catalyst the noble metal is not sintered or significantly inhibited from being sintered even in a lean atmosphere at high temperatures due to the noble metal entrapped in the complex oxide crystals.

Furthermore, another object of the present invention is to provide a method for preventing the highly heat-resistant complex oxide from being mutually sintered, and to provide a highly heat-resistant catalyst for purifying an exhaust gas capable of inhibiting a decrease in the specific surface area of the highly heat-resistant complex oxide.

The gist of the present invention will be described as follows.

(1) A catalyst for purifying an exhaust gas comprising a complex oxide comprising at least one of the noble metals and one or at least two elements selected from the group consisting of alkaline earth metals and Group IIIA elements, and at least one member which is selected from the group consisting of iron, nickel and cobalt is supported in the surface portion of the catalyst.

(2) A catalyst for purifying an exhaust gas comprising a complex oxide comprising at least one of the noble metals and one or at least two elements selected from the group consisting of alkaline earth metals and Group IIIA elements, the catalyst further comprising, as a constituent element of the complex oxide, at least one element selected from the group consisting of iron, nickel and cobalt.

(3) A catalyst for purifying an exhaust gas according to item (1) or (2), wherein the complex oxide comprises at least one member of a complex oxide selected from the group of complex oxides expressed by chemical structural formulas $X_4PmO_6$ (X=Ca, Sr, Ba, Mg), $X'_2Pm_2O_7$ (X'=Sc, La, Pr), $Sr_3X''PmO_6$ (X''=Co, Ni, Cu), $Ba_2ZPmO_6$ (Z=Pr, Ce) and $Ba_8Y_3Pm_4O_{17.5}$ where Pm=Pt, Rh, Pd.

(4) A catalyst for purifying an exhaust gas according to item (1) or (2), wherein the complex oxide further comprises Cu.

(5) A catalyst for purifying an exhaust gas according to item (1) or (2), wherein the addition amount of Fe, Ni and Co in total is 0.5 to 15.0% by weight.

(6) A catalyst for purifying an exhaust gas according to item (1) or (2), wherein the catalyst is produced by a sol-gel method.

(7) A catalyst for purifying an exhaust gas according to item (4), wherein the complex oxide comprises at least one member of a complex oxide selected from the group expressed by $Ba_4CuPm_2O_9$, $Ba_2Y_2CuPmO_8$, $Ba_2Y_2Cu_2PmO_9$, $Ba_3Y_2Cu_2PmO_{10}$, $Ba_{1.3}Sr_{1.7}Y_2Cu_2PmO_{10}$, $Ba_2Ho_2CuPmO_8$, $Ba_3Ho_2Cu_2PmO_{10}$, $Ba_2Er_2CuPmO_8$, and $Ba_2Er_2Cu_2PmO_{10}$ where Pm=Pt, Rh, Pd.

(8) A catalyst for purifying an exhaust gas according to item (1), (2) or (4), wherein a catalytic support oxide is mixed with the complex oxide.

(9) A catalyst for purifying an exhaust gas according to item (8), wherein the catalytic support oxide is at least one member selected from the group consisting of alumina, silica, titania, zirconia and ceria.

(10) A catalyst for purifying an exhaust gas according to item (8), wherein the catalytic support oxide is a complex oxide comprising each member selected from the group of alumina, silica, titania, zirconia and ceria and an alkaline earth metal element or a lanthanoid element.

DETAILED DESCRIPTION OF THE PREFERRED EMBODIMENT

The features of the present invention are as follows: the catalyst is given a heat resistance to temperatures as high as at least 1,000° C. by entrapping the noble metal into the complex oxide; the influence of sulfur dioxide is greatly reduced by adding iron, nickel or cobalt because the addition of the element of iron, nickel or cobalt tends to form a (stabilized) sulfide of iron, nickel or cobalt easily compared with a sulfide of an alkaline earth metal, and because sulfur dioxide is captured before reacting with the alkaline earth metal in the complex oxide by providing iron, nickel or cobalt near the surface or on the entire surface of the catalyst. In addition, sulfides of iron, etc. are decomposed at 500° C. and released without influencing the catalyst.

Reasons for restriction in the present invention will be explained below.

$SO_2$ generated by burning sulfur as an impurity of a fuel for automobiles is readily converted into $SO_3$ in a lean atmosphere. The $SO_3$ then forms sulfuric acid with a moisture in an exhaust gas, and the sulfuric acid forms sulfides and sulfates of an alkaline earth metal and a Group IIIA element to deteriorate the exhaust gas purifying performance of the catalyst. In order to diminish the catalyst poisoning caused by sulfur in the first aspect of the present invention, one of the Group VIIIA elements, i.e., Fe, Ni and Co, is supported on the surface portion of the catalyst to prevent catalyst poisoning. Moreover, in the second aspect of the present invention, catalyst poisoning caused by sulfur is diminished by entrapping one of the Group VIIIA elements into the complex oxide.

Although the function or operation of the Group VIIIA elements has not yet elucidated at present, it may be considered to be as follows. When Fe, Ni, Co and the like, are present in the catalyst, these elements are converted into sulfates, and the sulfates have a protecting function as a kind of gate which prevents poisoning of the catalyst constituent elements caused by sulfur because the sulfates tend to decompose; or even when the catalyst constituent elements form sulfides due to poisoning with sulfur, Fe, Ni, Co, etc., have a catalytic action of accelerated the decomposition of the sulfides.

As will be described in examples later, when the addition amount of Fe, Ni and Co in total is less than 0.5% by weight, no change has been observed in the behavior of sulfate formation subsequently to the endurance running. Moreover, when the amount exceeds 15% by weight, no improvement in the durability has been observed though sulfate formation is obviously inhibited. It may be concluded from the results that the addition amount is preferably from 0.5 to 15% by weight in total.

In addition, in the present invention, sintering the highly heat-resistant complex oxide caused by mutual contact thereof can be prevented by using Mg, Ca, Sr and Ba as the alkaline earth elements, and Sc, Y and lanthanoids (La, Ce, Pr, etc.) as the Group IIIA elements, employing $Al_2O_3$, $SiO_2$, $TiO_2$, $ZrO_2$, $CeO_2$, etc. as the catalytic support oxide, and mixing the catalytic support oxide with the highly heat-resistant complex oxide. As a result, a decrease in the specific surface area of the highly heat-resistant complex oxide can be inhibited, and a drop in catalysis can be prevented.

Addition of the catalytic support oxide in the present invention is carried out by adding the catalytic support oxide into the powder or the solution of the metal ions of the oxide. These complex oxides are highly heat-resistant complex oxides of noble metals (Pm: Pt, Rh, Pd) which are expressed by the following items (1) to (5) as the principal structures:

(1) $X_4PmO_6$ (X=Ca, Sr, Ba, Mg), (2) $X'_2Pm_2O_7$ (X'=Sc, La, Pr) wherein Sc, La and Pr are from a pyrochlore series ($X'_2Pt_2O_7$), (3) $Sr_3X''PmO_6$ (X''=Co, Ni, Cu) wherein these compounds correspond to the compounds of $Sr_4PtO_6$ whose one Sr is substituted, (4) $Ba_2ZPmO_6$ (Z=Pr, Ce), and (5) $Ba_8Y_3Pm_4O_{17.5}$ Next, securing the specific surface area of the highly heat-resistant complex oxide according to the present invention will be explained. Since the specific surface area of the complex oxide is proportional to the number of Pm ions existing on the surface (namely, surface area), the complex oxide having a larger specific surface area is more effective. In order to obtain the complex oxides each having a large specific surface area, all the complex oxides are synthesized by a sol-gel method. A vapor phase decomposition method may also be applied besides the sol-gel method. In addition, the catalytic support oxide in the present invention is primarily added for the purpose of preventing the Pm complex oxide from being sintered.

Moreover, Ba(Sr), Cu, Pm, X (X=Y, lanthanoids, inclusive of the case where X does not exist) can also be used as a Pm complex oxide having further improved durability in place of the Pm complex oxide $Ba_4PmO_6$, etc., described above. Further preferably, one or at least two of the noble metal complex oxides expressed by $Ba_4CuPm_2O_9$, $Ba_2Y_2CuPmO_8$, $Ba_2Y_2Cu_2PmO_9$, $Ba_3Y_2Cu_2PmO_{10}$, $Ba_{1.3}Sr_{1.7}Y_2Cu_2PmO_{10}$, $Ba_2Ho_2CuPmO_8$, $Ba_2Ho_2Cu_2PmO_{10}$, $Ba_2Er_2CuPmO_8$, $Ba_3Er_2Cu_2PmO_{10}$, etc., are used.

Furthermore, when the Pm complex oxide is mixed with $Al_2O_3$, the alkaline earth metal element in the complex oxide reacts with $Al_2O_3$ to form alkaline earth metal-aluminates. Accordingly, Pm precipitates during the endurance running. However, the present invention prevents the precipitation. This also means that the alkaline earth metal—$SiO_2$, $TiO_2$ and $ZrO_2$ complex oxides are formed also in the cases of $SiO_2$, $TiO_2$ and $ZrO_2$. Since the catalyst of the present invention not only has a high heat resistance but also contains an alkaline earth metal element, the catalyst reacts with difficulty with the alkaline earth metal element. As a result, the durability of the catalyst is improved.

Furthermore, since the reaction of the alkaline earth metal in the Pm complex oxide with the catalytic support can be inhibited by forming the catalytic support itself into a complex oxide, the durability of the catalyst for purifying an exhaust gas is improved, and the heat resistance of the catalytic support itself is improved.

The complex oxide catalytic support according to the present invention comprises $Al_2O_3$, $SiO_2$, $TiO_2$, $ZrO_2$, and an alkaline earth metal element or lanthanoid element. The preferred composition ratio X:M is from 1:0.3 to 1:20, more preferably from 1.:0.5 to 1:4 (X=alkaline earth metal, lanthanoid, M=Al, Si, Ti, Zr).

The present invention will be explained below in further detail with reference to examples.

EXAMPLES

Example 1

The present example relates to an $Ni/Ba_4PtO_6/BaO$—$Al_2O_3$ catalyst (Ba:Al=1:2).

First, 20 g of $PtCl_4$ was dissolved in 200 g of ethanol to give an A1 solution. To the A1 solution was added 400 g of an ethanol solution containing 10% by weight of $C_2H_5ONa$, and the mixture was refluxed for five hours to give a B1 solution. To the B1 solution was added 541 g of an ethanol solution containing 10% by weight of $Ba(OC_2H_5)$ to give a C1 solution. To the C1 solution was added 120 g of water to form a precipitate. The precipitate was separated by centrifugal separation, and decreased in a nitrogen gas stream at 500° C. for 3 hours, followed by treating at 1,000° C. for 5 hours to give a complex oxide powder D1.

In 50 g of deionized water was dissolved 2.12 g of $Ni(CH_3COO)_2 4H_2O$ to give an E1 solution.

To the E1 solution was added 49.5 g of the complex oxide powder D1, and the water was evaporated while the mixture was stirred on a water bath, followed by treating in the air at 500° C. for 1 hour to give a complex oxide powder F1.

In 350 g of isopropanol was dissolved 26.9 g of Ba(OC$_3$H$_7$)$_3$ and 80 g of Al(OC$_3$H$_7$)$_3$. The solution was heated and refluxed on a water bath at 70° C. for 3 hours to give an O1 solution. To the O1 solution was added 56 g of deionized water, drop by drop, while the O1 solution was stirred. The dried product was degreased in a nitrogen gas stream at 500° C. for 3 hours, followed by treating in the air at 1,000° C. for 5 hours to give a complex oxide powder P1.

A catalyst of Example 1 was obtained by sufficiently mixing 2.88 g of the complex oxide powder F1 and 50 g of the complex oxide powder P1 with a mortar.

Example 2

The present example relates to an Ni/Ba$_4$PtO$_6$/BaO—Al$_2$O$_3$ catalyst (Ba:Al=1.:2).

In 50 g of deionized water was dissolved 12.72 g of Ni(CH$_3$COO)$_2$4H$_2$O to give an E2 solution.

To the E2 solution was added 47 g of the complex oxide powder D1, and the water was evaporated while the mixture was stirred on a water bath, followed by treating in the air at 500° C. for 1 hour to give a complex oxide powder F2.

A catalyst of Example 2 was obtained by sufficiently mixing 3.04 g of the complex oxide powder F2 and 50 g of the complex oxide powder P1 with a mortar.

Example 3

The present example relates to a Co/Ba$_4$PtO$_6$/BaO—Al$_2$O$_3$ catalyst (Ba:Al=1:2).

In 50 g of deionized water was dissolved 2.11 g of Co(CH$_3$COO)$_2$4H$_2$O to give an E3 solution.

To the E3 solution was added 49.5 g of the complex oxide powder D1, and the water was evaporated while the mixture was stirred on a water bath, followed by treating in the air at 500° C. for 1 hour to give a complex oxide powder F3.

A catalyst of Example 3 was obtained by sufficiently mixing 2.88 g of the complex oxide powder F3 and 50 g of the complex oxide powder P1 with a mortar.

Example 4

The present example relates to an Fe/Ba$_4$PtO$_6$/BaO—Al$_2$O$_3$ catalyst (Ba:Al=1:2).

In 50 g of deionized water was dissolved 1.56 g of Fe(CH$_3$COO)$_2$ to give an E4 solution.

To the E4 solution was added 49.5 g of the complex oxide powder D1, and the water was evaporated while the mixture was stirred on a water bath, followed by treating in the air at 500° C. for 1 hour to give a complex oxide powder F4.

A catalyst of Example 4 was obtained by sufficiently mixing 2.88 g of the complex oxide powder F4 and 50 g of the complex oxide powder P1 with a mortar.

Example 5

The present example relates to an Ni/Sr$_4$PtO$_6$/BaO—Al$_2$O$_3$ catalyst (Ba:Al=1:2).

First 20 g of PtCl$_4$ was dissolved in 200 g of ethanol to give an A5 solution. To the A5 solution was added 400 g of an ethanol solution containing 10% by weight of C$_2$H$_5$ONa, and the mixture was refluxed for five hours to give a B5 solution. To the B5 solution was added 426 g of an ethanol solution containing 10% by weight of Sr(OC$_2$H$_5$) to give a C5 solution. To the C5 solution was added 120 g of water to form a precipitate. The precipitate was separated by centrifugal separation, and degreased in a nitrogen gas stream at 500° C. for 3 hours, followed by treating in the air at 1,000° C. for 5 hours to give a complex oxide powder D5.

In 50 g of deionized water was dissolved 16.96 g of Ni(CH$_3$COO)$_2$4H$_2$O to give an E5 solution.

To the E5 solution was added 46 g of the complex oxide powder D5, and the water was evaporated while the mixture was stirred on a water bath, followed by treating in the air at 500° C. for 1 hour to give a complex oxide powder F5.

A catalyst of Example 5 was obtained by sufficiently mixing 2.36 g of the complex oxide powder F5 and 50 g of the complex oxide powder P1 with a mortar.

Example 6

The present example relates to an Ni/Sr$_4$RhO$_6$/BaO—Al$_2$O$_3$ catalyst (Ba:Al=1:2).

First 12.4 g of RhCl$_3$ was dissolved in 200 g of ethanol to give an A6 solution. To the A6 solution was added 400 g of an ethanol solution containing 10% by weight of C$_2$H$_5$ONa, and the mixture was refluxed for five hours to give a B6 solution. To the B6 solution was added 426 g of an ethanol solution containing 10% by weight of Sr(OC$_2$H$_5$) to give a C6 solution. To the C6 solution was added 120 g of water to form a precipitate. The precipitate was separated by centrifugal separation, and decreased in a nitrogen gas stream at 500° C. for 3 hours, followed by treating in the air at 1,000° C. for 5 hours to give a complex oxide powder D6.

In 50 g of deionized water was dissolved 17.0 g of Ni(CH$_3$COO)$_2$4H$_2$O to give an E6 solution.

To the E6 solution was added 46 g of the complex oxide powder D6, and the water was evaporated while the mixture was stirred on a water bath, followed by treating in the air at 500° C. for 1 hour to give a complex oxide powder F6.

A catalyst of Example 6 was obtained by sufficiently mixing 1.58 g of the complex oxide powder F6 and 50 g of the complex oxide powder P1 with a mortar.

Example 7

The present example relates to a Co/Sr$_4$RhO$_6$/BaO—Al$_2$O$_3$ catalyst (Ba:Al=1:2).

In 50 g of deionized water was dissolved 16.9 g of Co(CH$_3$COO)$_2$4H$_2$O to give an E7 solution.

To the E7 solution was added 46 g of the complex oxide powder D7, and the water was evaporated while the mixture was stirred on a water bath, followed by treating in the air at 500° C. for 1 hour to give a complex oxide powder F7.

A catalyst of Example 7 was obtained by sufficiently mixing 1.58 g of the complex oxide powder F7 and 50 g of the complex oxide powder P1 with a mortar.

Example 8

The present example relates to an Ni/Sr$_2$PdO$_3$/BaO—Al$_2$O$_3$ catalyst (Ba:Al=1:2).

First 26.9 g of PdCl$_2$ was dissolved in 200 g of ethanol to give an A8 solution. To the A8 solution was added 400 g of an ethanol solution containing 10% by weight of C$_2$H$_5$ONa, and the mixture was refluxed for five hours to give a B8 solution. To the B8 solution was added 402 g of an ethanol solution containing 10% by weight of Sr(OC$_2$H$_5$) to give a C8 solution. To the C8 solution was added 164 g of water to form a precipitate. The precipitate was separated by centrifugal separation, and degreased in a nitrogen gas stream at 500° C. for 3 hours, followed by treating in the air at 1,100° C. for 5 hours to give a complex oxide powder D8.

In 50 g of deionized water was dissolved 16.96 g of Ni(CH$_3$COO)$_2$4H$_2$O to give an E5 solution.

To the E5 solution was added 49.5 g of the complex oxide powder D8, and the water was evaporated while the mixture was stirred on a water bath, followed by treating in the air at 500° C. for 1 hour to give a complex oxide powder F8.

A catalyst of Example 8 was obtained by sufficiently mixing 1.62 g of the complex oxide powder F8 and 50 g of the complex oxide powder P1 with a mortar.

Example 9

The present example relates to an Ni—$Ba_4PtO_6$/BaO—$Al_2O_3$ catalyst (Ba:Al=1:2).

First 20.0 g of $PtCl_4$ and 1.12 g of $NiCl_2$ were dissolved in 200 g of ethanol to give an A9 solution. To the A9 solution was added 400 g of an ethanol solution containing 10% by weight of $C_2H_5ONa$, and the mixture was refluxed for five hours to give a B9 solution. The B9 solution was mixed with 541 g of an ethanol solution containing 10% by weight of $Ba(OC_2H_5)$ to give a C9 solution. To the C9 solution was added 120 g of water to form a precipitate. The precipitate was separated by centrifugal separation, and degreased in a nitrogen gas stream at 500° C. for 3 hours, followed by treating in the air at 1,000° C. for 5 hours to give a complex oxide powder D9.

A catalyst of Example 9 was obtained by sufficiently mixing 2.88 g of the complex oxide powder D9 and 50 g of the complex oxide powder P1 with a mortar.

Comparative Example 1

The present comparative example relates to a $Pt/Al_2O_3$ catalyst. The method of preparing the catalyst of the comparative example was as follows. First, 50 g of $\gamma$-$Al_2O_3$ was placed in 313 g of an aqueous dinitrodiammine Pt solution (0.2 wt. % interns of Pt), and the mixture was stirred. The water was evaporated on a water bath, and the product was dried at 120° C. for twenty-four hours, followed by calcining the dried product in the air at 500° C. for 1 hour to give a catalyst of Comparative Example 1.

Comparative Example 2

The present comparative example relates to a $Ba_4PtO_6$/BaO—$Al_2O_3$ catalyst (Ba:Al=1:2).

A catalyst of Comparative Example 2 was obtained by sufficiently mixing 2.85 g of the complex oxide powder D1 and the complex oxide powder P1 with a mortar.

Comparative Example 3

The present comparative example relates to an Ni/$Ba_4PtO_6$/BaO—$Al_2O_3$ catalyst (Ba:Al=1:2).

In 50 g of deionized water was dissolved 0.424 g of $Ni(CH_3COO)_2 4H_2O$ to give an E13 solution.

To the E13 solution was added 49.9 g of the complex oxide powder D1, and the water was evaporated while the mixture was stirred on a water bath, followed by treating in the air at 500° C. for 1 hour to give a complex oxide powder F13.

A catalyst of Comparative Example 3 was obtained by sufficiently mixing 2.85 g of the complex oxide powder F13 and 50 g of the complex oxide powder P1 with a mortar.

Comparative Example 4

The present comparative example relates to an Ni/$Ba_4PtO_6$/BaO—$Al_2O_3$ catalyst (Ba:Al=1:2).

In 200 g of deionized water was dissolved 42.4 g of $Ni(CH_3COO)_2 4H_2O$ to give an E14 solution.

To the E14 solution was added 49.9 g of the complex oxide powder D1, and the water was evaporated while the mixture was stirred on a water bath, followed by treating in the air at 500° C. for 1 hour to give a complex oxide powder F14.

A catalyst of Comparative Example 4 was obtained by sufficiently mixing 3.61 g of the complex oxide powder F14 and the complex oxide powder P1 with a mortar.

Comparative Example 5

The present comparative example relates to an $Sr4PtO_6$/BaO—$Al_2O_3$ catalyst (Ba:Al=1:2).

A catalyst of Comparative Example 5 was obtained by sufficiently mixing 2.16 g of the complex oxide powder D5 and 50 g of the complex oxide powder P1 with a mortar.

Comparative Example 6

The present comparative example relates to an $Sr_4PtO_6$/BaO—$Al_2O_3$ catalyst (Ba:Al=1:2).

A catalyst of Comparative Example 6 was obtained by sufficiently mixing 1.45 g of the complex oxide powder D6 and 50 g of the complex oxide powder P1 with a mortar.

Comparative Example 7

The present comparative example relates to an $Sr_2PdO_3$/BaO—$Al_2O_3$ catalyst (Ba:Al=1:2).

A catalyst of Comparative Example 7 was obtained by sufficiently mixing 1.60 g of the complex oxide powder D8 and 50 g of the complex oxide powder P1 with a mortar.

Next, the method of evaluating the performance of the catalysts of Examples 1 to 9 and those of Comparative Examples 1 to 7 will be explained.

After each of the catalysts was pressed by a CIP (cold isostatic press), it was pulverized and shaped to have a size of 1.7 to 1.0 mm. Before the performance evaluation, each test piece was subjected to endurance treatment at 1,000° C. for 10 hours. Table 1 shows the endurance treatment gas composition ($SO_2$+a composition corresponding to an air fuel ratio (A/F) of 16).

TABLE 1

| $O_2$ | CO | $C_3H_6$ | NO | $CO_2$ | $H_2O$ | $SO_2$ | $N_2$ |
|---|---|---|---|---|---|---|---|
| 1.50% | 0.10% | 0.057% | 0.25% | 14.5% | 10% | 50 ppm | balance |

Next, the catalytic conversion efficiency was measured by using a normal pressure flow type reactor. Table 2 shows the gas composition for measuring the catalytic conversion efficiency (corresponding to a stoichiometric composition) at the time of measurement.

TABLE 2

| $O_2$ | CO | $C_3H_6$ | NO | $CO_2$ | $H_2O$ | $N_2$ |
|---|---|---|---|---|---|---|
| 0.30% | 0.20% | 0.067% | 0.20% | 14.5% | 10% | balance |

The flow rate of the gas for measuring the catalytic conversion efficiency at the time of measurement was 5 l/min, and the weight of the catalyst was 2.0 g. The catalyst bed temperature was set at 500, 450, 400, 350, 300 or 250° C., and the catalytic conversion efficiency was measured at each of the temperatures mentioned above when a steady state was reached. The catalytic conversion efficiency herein is defined as described below.

Catalytic conversion efficiency=[(inlet gas concentration–outlet gas concentration)/inlet gas concentration]×100

Next, the temperature at which the catalytic conversion efficiency reached 50% (which will be hereinafter termed "HC-$T_{50}$" ($C_3H_6$ component), "NO-$T_{50}$". (NO component)) was determined by plotting the catalyst conversion efficiency against the catalyst bed temperature. The results are summarized in Table 3.

TABLE 3

|  | Catalyst (Ba:Al = 1:2 in BaO—$Al_2O_3$) | Amount of Pt, Rh or Pd (wt. %) | Addition amount of Ni, Co, Fe (Ba$Al_2O_4$ excluded) (wt. %) | HC - $T_{50}$ (° C.) | NO - $T_{50}$ (° C.) |
|---|---|---|---|---|---|
| Ex. 1 | Ni/Ba$_4$PtO$_6$/BaO—$Al_2O_3$ | 1.25 | 1.0 | 383 | 440 |
| Ex. 2 | Ni/Ba$_4$PtO$_6$/BaO—$Al_2O_3$ | 1.25 | 6.0 | 389 | 447 |
| Ex. 3 | Co/Ba$_4$PtO$_6$/BaO—$Al_2O_3$ | 1.25 | 1.0 | 426 | 446 |
| Ex. 4 | Fe/Ba$_4$PtO$_6$/BaO—$Al_2O_3$ | 1.25 | 1.0 | 408 | 438 |
| Ex. 5 | Ni/Sr$_4$PtO$_6$/BaO—$Al_2O_3$ | 1.25 | 8.0 | 390 | 432 |
| Ex. 6 | Ni/Sr$_4$RhO$_6$/BaO—$Al_2O_3$ | 1.00 | 10.0 | 392 | 415 |
| Ex. 7 | Co/Sr$_4$RhO$_6$/BaO—$Al_2O_3$ | 1.00 | 10.0 | 401 | 417 |
| Ex. 8 | Ni/Sr$_4$PdO$_3$/BaO—$Al_2O_3$ | 1.25 | 1.0 | 427 | 465 |
| Ex. 9 | Ni/Ba$_4$PtO$_6$/BaO—$Al_2O_3$ | 1.25 | 1.0 | 387 | 453 |
| Comp. Ex. 1 | Pt/$Al_2O_3$/ | 1.25 | — | 448 | 460 |
| Comp. Ex. 2 | Ba$_4$PtO$_6$/BaO—$Al_2O_3$ | 1.25 | — | 444 | 451 |
| Comp. Ex. 3 | Ni/Ba$_4$PtO$_6$/BaO—$Al_2O_3$ | 1.25 | 0.2 | 441 | 450 |
| Comp. Ex. 4 | Ni/Ba$_4$PtO$_6$/BaO—$Al_2O_3$ | 1.25 | 15.0 | 435 | 474 |
| Comp. Ex. 5 | Sr$_4$PtO$_6$/BaO—$Al_2O_3$ | 1.25 | — | 433 | 436 |
| Comp. Ex. 6 | Sr$_4$RhO$_6$/BaO—$Al_2O_3$ | 1.00 | — | 424 | 422 |
| Comp. Ex. 7 | Sr$_4$PdO$_3$/BaO—$Al_2O_3$ | 1.25 | — | 457 | 504 |

Clearly, the following conclusion can be drawn from Table 3. The catalyst in any of Examples 1 to 4 has a lower HC-$T_{50}$ and a lower NO-$T_{50}$ and a higher catalytic conversion efficiency than the catalyst in any of Comparative Examples 1 to 2. It is seen from Examples 1 to 2 and Comparative Examples 3 to 4 that the addition amount of Fe, Co or Ni is preferably from 0.5 to 15% by weight based on the noble metal complex oxide. When the addition amount is less than 0.5% by weight or exceeds 15% by weight, the addition shows no effect. It can be generally recognized from Examples 2, 6 to 8, and Comparative Examples 2, 5 to 7 that the addition of Fe, Co or Ni improves the durability of the noble metal complex oxide. In addition, Fe, Co or Ni may be added subsequently to the preparation of the noble metal complex oxide (Examples 1 to 7), or during the synthesis of the noble metal complex oxide (Example 9).

X-ray diffraction analysis of the catalyst subsequent to the endurance treatment in any of Comparative Examples 2, 3, 5 to 7 showed formation of BaSO$_4$ (or SrSO$_4$) which had not been present before the endurance treatment. BaSO$_4$ (or SrSO$_4$) was formed by the reaction of Ba$_4$PtO$_6$ (or Sr$_4$PtO$_6$) with SO$_2$ in the model gas. When BaSO$_4$ is formed, Pt in Ba$_4$PtO$_6$ is estimated to become unstabilized, and metal Pt is considered to be precipitated to lower the catalyst activity.

In contrast to the catalysts in the comparative examples, formation of a sulfate was not observed in the catalyst of the present invention even after the endurance treatment. That is, since the catalyst of the present invention is excellent in structural stability in an exhaust gas atmosphere containing SO$_2$, the catalyst is thought to show improved durability compared with the catalysts in comparative examples. Moreover, when the addition amount of Fe, Co or Ni was less than 0.5% by weight based on the noble metal complex oxide, no change was observed in the behavior of the formation of sulfates subsequently to the endurance running (Examples 1 to 3). Although the formation of sulfates was evidently inhibited when the addition amount exceeded 15% by weight, no improvement was observed in the durability probably because excessive Fe, Co or Ni inhibited (poisoned) the catalytic conversion ability of a noble metal such as Pt or Rh (Examples 1 to 2, Comparative Example 2, 4).

Since the catalyst for purifying an exhaust gas of the present invention is stabilized at high temperatures even in an atmosphere containing SO$_2$, the catalyst has such durability that it can be used at least at 1,000° C. Moreover, the highly heat-resistant complex oxide can be prevented from sintering due to mutual contact, and a decrease in the specific surface area thereof can be inhibited by mixing a catalytic support oxide therewith. Accordingly, the durability of the catalyst can be further improved.

We claim:

1. A sulphur oxide resistant catalyst for purifying an exhaust gas, comprising:

(i) a complex oxide containing at least one noble metal selected from the group of complex oxides having the formulas: $X_4PmO_6$, wherein X is Ca, Sr, Ba or Mg;

$X'_2Pm_2O_7$, wherein X' is Sc, La or Pr; $Sr_3X''PmO_6$, wherein X" is Co, Ni or Cu; $Ba_2ZPmO_6$, wherein Z is Pr or Ce and $Ba_8Y_3Pm_4O_{17.5}$), wherein Pm is Pt, Rh or Pd and from 1.0–10% by weight of at least one element selected from the group consisting of iron, cobalt and nickel, based on the total weight of noble metal containing complex oxide, supported on (ii) a catalyst support of the combination of (a) an alkaline earth metal element or a lanthanoid element and (b) an oxide selected from the group consisting of alumina, silica, titania, zirconia and ceria.

2. A sulfur oxide resistant catalyst for purifying an exhaust gas, comprising:

(i) a complex oxide containing at least one noble metal selected from the group of complex oxides having the formulas: $X_4PmO_6$, wherein X is Ca, Sr, Ba or Mg; $X'_2Pm_3O_7$, wherein X' is Sc, La or Pr; $Sr_3X''PMO_6$, wherein X" is Co, Ni or Cu; $Ba_2ZPmO_6$, wherein Z is Pr or Ce; and $Ba_8Y_3Pm_4O_{17.5}$, wherein Pm is Pt, Rh or Pd and from 1.0–10.0% by weight of at least one element selected from the group consisting of iron, nickel and cobalt, based on the weight of noble metal containing complex oxide.

3. A catalyst for purifying an exhaust gas according to claim 1 or 2, wherein said complex oxide further comprises Cu.

4. A catalyst for purifying an exhaust gas according to claim 1 or 2, wherein said catalyst is produced by a sol-gel method.

5. A catalyst for purifying an exhaust gas according to claim 3, wherein said complex oxide comprises at least one member of a complex oxide selected from the group expressed by $Ba_4CuPm_2O_9$, $Ba_2Y_2CuPmO_8$, $Ba_2Y_2Cu_2PmO_9$, $Ba_3Y_2Cu_2PmO_{10}$, $Ba_{1.3}Sr_{1.7}Y_2Cu_2PmO_{10}$, $Ba_2Ho_2CuPmO_8$, $Ba_3Ho_2Cu_2PmO_{10}$, $Ba_2Er_2CuPmO_8$, and $Ba_2Er_2Cu_2PmO_{10}$ where Pm=Pt, Rh, Pd.

6. A catalyst for purifying an exhaust gas according to claim 3, wherein a catalytic support oxide is mixed with said complex oxide.

7. A catalyst for purifying an exhaust gas according to claim 6, wherein said catalytic support oxide is at least one member selected from the group consisting of alumina, silica, titania, zirconia and ceria.

8. A catalyst for purifying an exhaust gas according to claim 6, wherein said catalytic support oxide is a complex oxide comprising each member selected from the group of alumina, silica, titania, zirconia and ceria and an alkaline earth metal element or a lanthanoid element.

* * * * *